United States Patent [19]
Yoon

[11] Patent Number: 5,825,422
[45] Date of Patent: Oct. 20, 1998

[54] METHOD AND APPARATUS FOR ENCODING A VIDEO SIGNAL BASED ON INTER-BLOCK REDUNDANCIES

[75] Inventor: Sung-Wook Yoon, Seoul, Rep. of Korea

[73] Assignee: Daewoo Electronics Co. Ltd., Seoul, Rep. of Korea

[21] Appl. No.: 774,833

[22] Filed: Dec. 27, 1996

[30]     Foreign Application Priority Data

Dec. 29, 1995 [KR] Rep. of Korea ...................... 95-64304

[51] Int. Cl.$^6$ .................................................. H04N 7/32
[52] U.S. Cl. .......................... 348/410; 348/400; 348/403; 348/420; 348/421
[58] Field of Search .................................. 348/410, 400, 348/403, 409, 384, 390, 420–421, 401, 412, 415; 382/244–246; H04N 7/32

[56]             References Cited

U.S. PATENT DOCUMENTS

| | | | |
|---|---|---|---|
| 4,821,119 | 4/1989 | Gharavi et al. | 348/402 |
| 4,837,618 | 6/1989 | Hatori et al. | 348/401 |
| 4,942,465 | 7/1990 | Ohta | 348/413 |
| 4,942,467 | 7/1990 | Waldman et al. | 348/412 |
| 5,132,792 | 7/1992 | Yonemitsu et al. | 348/416 |
| 5,136,371 | 8/1992 | Savatier et al. | 348/419 |
| 5,136,378 | 8/1992 | Tsurube | 348/415 |
| 5,142,362 | 8/1992 | Masera et al. | 348/384 |
| 5,150,432 | 9/1992 | Ueno et al. | 382/250 |
| 5,155,593 | 10/1992 | Yonemitsu et al. | 348/413 |
| 5,164,828 | 11/1992 | Tahara et al. | 348/412 |
| 5,212,742 | 5/1993 | Normille et al. | 382/166 |
| 5,214,506 | 5/1993 | Lin et al. | 348/415 |
| 5,684,536 | 11/1997 | Sugiyama et al. | 348/403 |

FOREIGN PATENT DOCUMENTS

| | | | |
|---|---|---|---|
| 8-228354 | 9/1996 | Japan | H04N 7/32 |
| 95/15531 | 6/1995 | WIPO | G06F 17/14 |

*Primary Examiner*—Tommy P. Chin
*Assistant Examiner*—Vu Le
*Attorney, Agent, or Firm*—Pennie & Edmonds LLP

[57]             ABSTRACT

A frame of a video signal, wherein the frame is divided into non-overlapping blocks of M×N pixels, M and N being positive integers, respectively, is encoded by: arranging the blocks into groups of P×Q blocks, P and Q being positive integers, respectively; transforming each of the P×Q blocks in a group into a set of M×N transform coefficients to thereby provide P×Q sets of M×N transform coefficients for the group, the transform coefficients in each set representing different frequency components, respectively; quantizing the sets of transform coefficients into P×Q sets of M×N quantized transform coefficients; DPCM(differential pulse code modulation) coding the sets of quantized transform coefficients to provide P×Q sets of DPCM coefficients, wherein one set of DPCM coefficients is identical to one of the sets of quantized transform coefficients and each of the DPCM coefficients included in the remaining sets represents a difference between two quantized transform coefficients of an identical frequency component; and setting the P×Q sets of DPCM coefficients as encoded data for the group of P×Q blocks.

20 Claims, 3 Drawing Sheets

FIG.2

|        |        |        |
|--------|--------|--------|
| C(1,1) | C(1,2) | C(1,6) |
| C(1,3) | C(1,5) | C(1,7) |
| C(1,4) | C(1,8) | C(1,9) |

B1

|        |        |        |
|--------|--------|--------|
| C(2,1) | C(2,2) | C(2,6) |
| C(2,3) | C(2,5) | C(2,7) |
| C(2,4) | C(2,8) | C(2,9) |

B2

|        |        |        |
|--------|--------|--------|
| C(3,1) | C(3,2) | C(3,6) |
| C(3,3) | C(3,5) | C(3,7) |
| C(3,4) | C(3,8) | C(3,9) |

B3

|        |        |        |
|--------|--------|--------|
| C(4,1) | C(4,2) | C(4,6) |
| C(4,3) | C(4,5) | C(4,7) |
| C(4,4) | C(4,8) | C(4,9) |

| D(1,1) | D(1,2) | D(1,6) |
|--------|--------|--------|
| D(1,3) | D(1,5) | D(1,7) |
| D(1,4) | D(1,8) | D(1,9) |

DB2

| D(2,1) | D(2,2) | D(2,6) |
|--------|--------|--------|
| D(2,3) | D(2,5) | D(2,7) |
| D(2,4) | D(2,8) | D(2,9) |

DB3

| D(3,1) | D(3,2) | D(3,6) |
|--------|--------|--------|
| D(3,3) | D(3,5) | D(3,7) |
| D(3,4) | D(3,8) | D(3,9) |

DB4

| D(4,1) | D(4,2) | D(4,6) |
|--------|--------|--------|
| D(4,3) | D(4,5) | D(4,7) |
| D(4,4) | D(4,8) | D(4,9) |

METHOD AND APPARATUS FOR ENCODING A VIDEO SIGNAL BASED ON INTER-BLOCK REDUNDANCIES

FIELD OF THE INVENTION

The present invention relates to a method and apparatus for encoding a video signal; and, more particularly, to an encoder capable of improving the coding efficiency based on correlations between blocks of pixels in a video frame.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is necessary to compress or reduce the volume of the transmission data.

The image signal can be normally compressed without seriously affecting its integrity because there usually exist certain correlationships or redundancies among some of the pixels in a single frame and also among those of neighboring frames. Accordingly, most of prior art image signal encoding methods employ various compression techniques built on the idea of utilizing or truncating the redundancies.

One category of such coding methods relates to transform techniques which take advantage of the redundancies existing in a single frame; and includes orthogonal transform methods which convert a block of digital image data into a set of transform coefficients, e.g., a two-dimensional Discrete Cosine Transform(DCT).

Specifically, in the orthogonal transform method such as DCT(discrete cosine transform) or the like, a frame of video signals is divided into equal-sized non-overlapping blocks, for example, blocks of 8×8 pixels, and each of the blocks is transformed from the spatial domain to the frequency domain. As a result, a set of transform coefficients including one DC coefficient and a plurality of(e.g., 63) AC coefficients is obtained for each block. The transform coefficients in a set represent amplitudes of respective frequency components of the pixels in a block, and, in particular, the DC coefficient of the block reflects the average intensity of the pixels in the block, while the AC coefficients represent intensities of the spatial frequency components of the pixels.

The transform coefficients are then quantized based on a predetermined quantization matrix and a quantization scale, wherein the quantization scale may be determined for every macroblock which includes a predetermined number of, e.g., four, blocks, based on, e.g., an activity of an input video signal and an amount of data stored in a transmission buffer. By processing such quantized transform coefficients with a statistical coder employing, e.g., variable length coding (VLC), the amount of data to be transmitted can be effectively compressed.

However, these conventional coding schemes described above merely utilize spatial redundancies within a block, without taking into account correlations between blocks in a video frame.

SUMMARY OF THE INVENTION

It is, therefore, a primary object of the present invention to provide a method and apparatus capable of improving the coding efficiency by taking advantage of spatial redundancies among neighboring blocks in a video frame.

In accordance with the present invention, there is provided a method for encoding a frame of a video signal, wherein the frame is divided into non-overlapping blocks of M×N pixels, M and N being positive integers, respectively, comprising the steps of:

arranging the blocks into groups of P×Q blocks, P and Q being positive integers, respectively;

transforming each of the P×Q blocks in a group into a set of M×N transform coefficients to thereby provide P×Q sets of M×N transform coefficients for the group, said transform coefficients in each set representing different frequency components, respectively;

quantizing the sets of transform coefficients into P×Q sets of M×N quantized transform coefficients;

DPCM(differential pulse code modulation) coding the sets of quantized transform coefficients to provide P×Q sets of DPCM coefficients, wherein one set of DPCM coefficients is identical to one of the sets of quantized transform coefficients and each of the DPCM coefficients included in the remaining sets represents a difference between two quantized transform coefficients of an identical frequency component; and setting the P×Q sets of DPCM coefficients as encoded data for the group of P×Q blocks.

BRIEF DESCRIPTION OF THE DRAWINGS

The above and other objects and features of the present invention will become apparent from the following description of preferred embodiments given in conjunction with the accompanying drawings, in which:

FIG. 2 illustrates sets of transform coefficients; and

FIG. 3 represents sets of DPCM(differential pulse code modulation) coefficients.

DETAILED DESCRIPTION OF THE PREFERRED EMBODIMENTS

Figure 1:
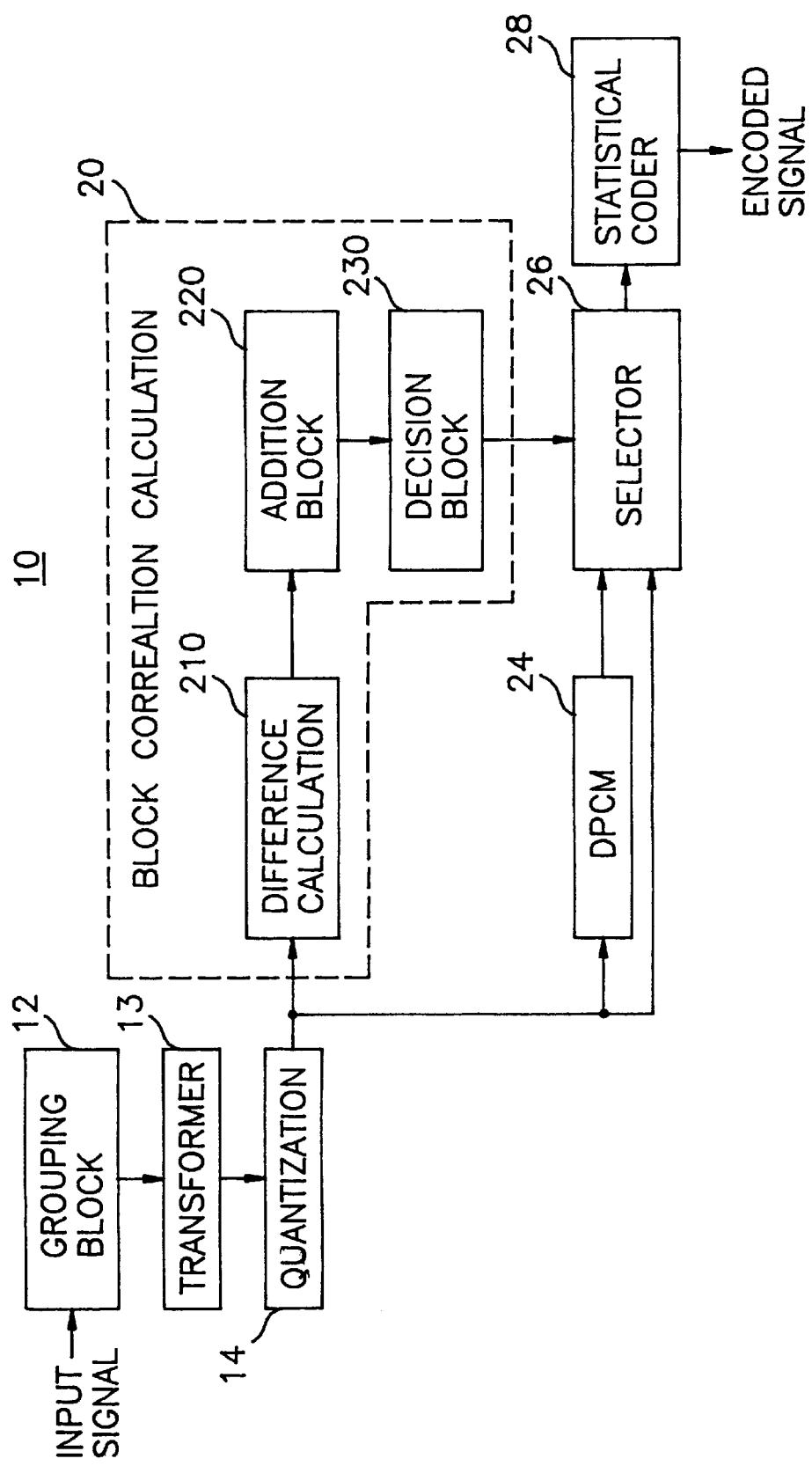
FIG. 1 shows a block diagram of an encoding device in accordance with a preferred embodiment of the present invention.

In FIG. 1, there is illustrated a block diagram of an encoding apparatus 10 in accordance with a preferred embodiment of the present invention, which includes a grouping block 12, a transformer 13, a quantization block 14, a block correlation calculation block 20, a DPCM (differential pulse code modulation) block 24, a selector 26, and a statistical coder 28.

An input signal of a video frame is fed to the grouping block 12, wherein the video frame is divided into equal-sized non-overlapping blocks of M×N, e.g., 8×8, pixels and 2×2 neighboring blocks constitute a macroblock, M and N being positive integers, respectively. At the grouping block 12, the blocks are arranged into groups of P×Q blocks, P and Q being positive integers, respectively. In a preferred embodiment of the invention, both P and Q are set to 2. That is, 2×2 sets of pixels which correspond to 2×2 blocks included in a macroblock are arranged as a group, each set including M×N pixels.

The transformer 13, which converts, by using e.g., DCT, pixel data of the input signal from the spatial domain into the frequency domain, generates for each of the P×Q blocks in a group, fed thereto from the grouping block 12, a set of M×N transform coefficients, each transform coefficient representing an amplitude of a frequency component.

Referring to FIG. 2, there is illustrated a group of transform coefficients having P×Q, e.g., 2×2, sets of transform coefficients B1 to B4, wherein for the sake of simplicity, both M and N are assumed to be 3; and, therefore, a set of transform coefficients includes 3×3 transform coefficients therein. In FIG. 2, a transform coefficient C(i,j) represents a j-th frequency component in an i-th set of transform coefficients, wherein i=1, 2, . . . , I(=P×Q); j=1, 2, . . . , J(=M×N); and a frequency component corresponding to a transform coefficient of a greater index j value is higher than that corresponding to a transform coefficient of a smaller index j value. For instance, C(1, 5) represents a transform coefficient corresponding to a 5th frequency component of a first set B1; C(i,1), a DC transform coefficient in an i-th set; C(i,9), an AC transform coefficient of a highest frequency in the i-th set; and each set Bi includes transform coefficients C(i,1) to C(i,9). Each group of transform coefficients is provided to quantization block 14.

The quantization block 14 converts the P×Q sets of M×N transform coefficients in a group to thereby provide P×Q sets of M×N quantized transform coefficients QB1 to QBi, QBi representing a set of quantized coefficients obtained from the set of transform coefficients Bi, i ranging from 1 to I, through the use of a conventional quantization method, wherein the quantization of a set of transform coefficients is carried out based on a preset quantization matrix and a quantization scale determined for a macroblock. The sets of quantized transform coefficients for the group are coupled to the block correlation calculation block 20, the selector 26 and the DPCM block 24. It should be noted that DC coefficients included in the sets of transform coefficients are DPCM coded as in a conventional encoder in case the input signal is of an intramode.

The DPCM block 24 codes the sets of quantized transform coefficients using a conventional DPCM technique to thereby generate P×Q sets of DPCM coefficients, wherein a DPCM coefficients D(i,j) is defined as:

D(i,j)=QC(i,j)−QC((i−1),j), wherein D(i,j) is a j-th DPCM coefficient in an i-th set of DPCM coefficients; QC(i,j) and Q(i−1,j) are j-th coefficients in the i-th and the (i−1)st sets of quantized transform coefficients, QBi and QB(i−1), respectively; and QC(0,j) is set to zero. The P×Q sets of M×N DPCM coefficients are provided from the DPCM block 24 to the selector 26.

Referring to FIG. 3, there are depicted P×Q sets of M×N DPCM coefficients encoded from the P×Q sets of quantized transform coefficients B1 to B4 shown in FIG. 2.

The block correlation calculation block 20 includes a difference calculation block 210, an addition block 220, and a decision block 230. The block correlation calculation block 20 assesses correlations among P×Q blocks corresponding to a group of transform coefficients, based on the sets of quantized transform coefficients for the group provided from the quantization block 14; and generates a selection signal to the selector 26.

In accordance with the preferred embodiment of the invention, the difference calculation block 210 calculates differences between the quantized transform coefficients representing an identical frequency component from two sets of quantized transform coefficients in a similar fashion as in the DPCM block 24; and generates a set of difference values for each set of transform coefficients representing an identical frequency component. The difference values may be defined as:

E(i,j)=|QC(i,j)−QC(i−1,j)| or

E(i,j)={QC(i,j)−QC(i−1,j)}$^2$, wherein E(i,j) is an i-th difference value in a j-th set of difference values; QC(i,j) and QC(i−1,j) are j-th quantized transform coefficients in the i-th and (i−1)st sets of transform coefficients, QBi and QB(i−1), respectively; and QC(0,j) is defined as zero.

In another preferred embodiment of the invention, the difference values are determined by considering weight factors thereto, defined as:

E(i,j)=w(j)·|QC(i,j)−QC(i−1,j)| or

E(i,j)=w(j)·{QC(i,j)−QC(i−1,j)}$^2$, wherein E(i,j), QC(i,j), QC(i−1, j) and QC(0,j) are identical to those defined above; and w(j) is a weight factor, being smaller than that corresponding to a smaller value of the index j.

The calculated difference values are then coupled to the addition block 220, wherein the difference values of a set are added together to provide a sum of difference values for a frequency component. The sum of difference values in a j-th set may be defined as:

$$S(j) = \sum_{i=1}^{I} E(i, j).$$

The sums of the difference values S(1) to S(I) for a group of quantized transform coefficients are then fed to the decision block 230 to be utilized in determining the degree of correlations between the quantized transform coefficients in the group. The decision block 230 assesses the degree of correlations in accordance with a predetermined decision criterion which will be described hereinafter, based on the sums of the difference values coupled thereto from the addition block 220. That is, if it is determined that the degree of correlations is high, the decision block 230 generates a first selection signal; and, otherwise, a second selection signal is generated therefrom.

Referring to the decision criterion for assessing the degree of correlations, the degree of correlations may be defined as:

$$DEG = \frac{1}{J} \cdot \sum_{j=1}^{J} S(j)$$

in accordance with a preferred embodiment of the invention. That is, the degree of correlations is obtained by averaging all the sums S(1) to S(J). In a second preferred embodiment of the invention, the degree of correlations may be determined based on the average of the sums for selected sets of difference values which correspond to lower frequency components. In such an instance, the degree of correlations may be defined as:

$$DEG = \frac{1}{K} \cdot \sum_{j=1}^{K} S(j)$$

with K being smaller than J, the total number of sets of difference values. In the first and the second embodiment, the degree of correlations is considered to be high if DEG is smaller than a predetermined threshold TH0; and the first selection signal is generated by the decision block 230; and, if otherwise, the second selection signal is issued therefrom.

In a third preferred embodiment of the invention, each of the S(j)'s, S(1) to S(J), is compared with a preset threshold TH1. If the number of S(j)'s which are smaller than TH1 is larger than a preset number K2, the degree of correlations is determined as to be high or considerable. Similarly, as in the first and the second embodiments, if the degree of correlations is regarded to be high or considerable, the first selection signal is provided by the decision block 230; and otherwise, the second selection signal is generated therefrom.

The selection signal, generated from the decision block 230, controls the selector 26 to select data between the output provided from the quantization block 14 and the one from the DPCM block 24. That is, if the first selection signal is inputted thereto, the P×Q sets of M×N DPCM coefficients from the DPCM block 24 are selected; and, if the second selection signal is received, the P×Q sets of M×N quantized transform coefficients from the quantization block 14 are selected by the selector 26. The selected data is then fed to the statistical coder 28.

At the statistical coder 28, the selected data from the selector 26 is encoded through the use of conventional statistical coding schemes such as RLC(run-length coding) and VLC(variable length coding). The encoded signal is then provided to a transmitter(not shown) for the transmission thereof.

Although only the application of the present invention to the video image signal has been described hereto, it can also be applied to a difference signal representing displacement between frames of data.

In the preferred embodiments of this invention explained hereto, the grouping size is set to P×Q. However, this can be varied by grouping the blocks having an identical quantization scale. For example, if a plurality of macroblocks has a same quantization scale assigned thereto, these macroblocks can be grouped together. Also, despite the fact that the degree of block correlations is determined based on the quantized transform coefficients in the preferred embodiments described hereto, this may be altered in such a manner that the degree of the correlations can be determined based on the transform coefficients.

Furthermore, while the present invention has been described with respect to certain preferred embodiments only, other modifications and variations can be made without departing from the spirit and scope of the present invention as set forth in the following claims.

What is claimed is:

1. A method for encoding a frame of a video signal, wherein the frame is divided into non-overlapping blocks of M×N pixels, M and N being positive integers, respectively, comprising the steps of:

(a) arranging the blocks into groups of P×Q blocks, P and Q being positive integers, respectively;

(b) transforming each of the P×Q blocks in a group into a set of M×N transform coefficients to thereby provide P×Q sets of M×N transform coefficients for the group, said transform coefficients in each set representing different frequency components, respectively;

(c) quantizing the sets of transform coefficients into P×Q sets of M×N quantized transform coefficients;

(d) DPCM(differential pulse code modulation) coding the sets of quantized transform coefficients to provide P×Q sets of DPCM coefficients, wherein one set of DPCM coefficients is identical to one of the sets of quantized transform coefficients and each of the DPCM coefficients included in the remaining sets represents a difference between two quantized transform coefficients of an identical frequency component; and (e) setting the P×Q sets of DPCM coefficients as encoded data for the group of P×Q blocks.

2. The method according to claim 1, wherein both M and N are 8 and both P and Q are equal to 2.

3. The method according to claim 1, further comprising, after the step (e), the steps of:

(f) calculating difference values between the quantized transform coefficients corresponding to an identical frequency component to thereby provide M×N sets of difference values;

(g) determining, based on the sets of difference values, whether a degree of correlations among the blocks in the group is high or low; and (h) if the degree of correlations is determined to be low, updating the encoded data with the P×Q quantized sets of M×N transform coefficients.

4. The method according to claim 3, further comprising, after the updating step (h), the step of (i) statistically coding the encoded data.

5. The method according to claim 4, wherein said transforming step (b) is carried out by using a DCT(discrete cosine transform) method and said statistically coding step (i) is performed by using of a RLC(run-length coding) and a VLC(variable length coding) techniques.

6. The method according to claim 3, wherein a quantized transform coefficient expressed as QC(i,j) represents the quantized transform coefficient corresponding to a j-th frequency component in an i-th set of quantized transform coefficients, said i being a positive integer ranging from 1 to I(=P×Q), and j being a positive integer ranging from 1 to J(=M×N).

7. The method according to claim 6, wherein said difference values are defined by an equation selected from the group consisting of:

$E(i,j) = |QC(i,j) - QC(i-1,j)|$,
$E(i,j) = \{QC(i,j) - QC(i-1,j)\}^2$,
$E(i,j) = w(j) \cdot |QC(i,j) - QC(i-1,j)|$, and
$E(i,j) = w(j) \cdot \{QC(i,j) - QC(i-1,j)\}^2$, wherein $E(i,j)$ is an i-th difference value in a j-th set of difference values, $w(j)$ is a weight factor and $QC(0,j)$ is set to zero.

8. The method according to claim 7, wherein said weight factor $w(j)$ is equal to or smaller than $w(j-1)$.

9. The method according to claim 8, wherein said determining step (g) includes the steps of:

(g1) providing a sum of difference values included in each set, a sum $S(j)$ for a j-th set of difference values being defined as $$S(j) = \sum_{i=1}^{I} E(i,j);$$

(g2) calculating the degree of correlations DEG defined as $$DEG = \frac{1}{K} \cdot \sum_{j=1}^{K} S(j)$$

K being a positive integer equal to or smaller than J;

(g3) comparing the degree of correlations DEG with a predetermined threshold value TH0; and (g4) if DEG is smaller than TH0, determining the degree of correlations to be high; and deciding the degree of correlations to be low, if otherwise.

10. The method according to claim 8, wherein said determining step (g) includes the steps of:

(g11) providing a sum of difference values included in each set, a sum $S(j)$ for a j-th set of difference values being defined as $$S(j) = \sum_{i=1}^{I} E(i,j);$$

(g12) comparing sums S(1) to S(K) with a preset threshold TH1, K being a positive integer not greater than J(=M×N);

(g13) obtaining the number of the sums which are smaller than TH1; and (g14) if the number of the sums is greater than a preset number, determining that the degree of correlations is high; and, if otherwise, determining that the degree of correlations is low.

11. A method for encoding a frame of a video signal, wherein the frame is divided into non-overlapping blocks of M×N pixels, M and N being positive integers, respectively, the method comprising the steps of:

(a) arranging the blocks into groups of P×Q blocks, P and Q being positive integers, respectively;

(b) transforming each of the P×Q blocks in a group into a set of M×N transform coefficients, to thereby provide P×Q sets of M×N transform coefficients C(i,j)'s for the group, a transform coefficient C(i,j) being a j-th frequency component in an i-th set of transform coefficients and a greater index j representing a higher frequency component than a smaller index j with i=1, . . . , I(=P×Q) and j=1 to J(=M×N);

(c) quantizing the sets of transform coefficients into P×Q sets of quantized M×N transform coefficients;

(d) DPCM(differential pulse code modulation) coding the sets of quantized sets of transform coefficients to provide P×Q sets of DPCM coefficients, wherein one set of DPCM coefficients is identical to one of the sets of quantized transform coefficients and each of the DPCM coefficients included in the other remaining sets represents a difference between two quantized transform coefficients of an identical frequency component;

(e) calculating difference values between the transform coefficients for each frequency component to thereby provide M×N sets of difference values;

(f) determining, based on the sets of difference values, whether a degree of correlations among the blocks in the group is high or low; and (h) selecting, as encoded data for the group of blocks, the sets of DPCM coefficients if the degree of correlations is high and the sets of quantized transform coefficients if otherwise.

12. The method according to claim 11, wherein a DPCM coefficient is defined as:

D(i,j)=QC(i,j)−QC(i−1,j), wherein D(i,j) represents a j-th DPCM coefficient in an i-th set of DPCM coefficients; QC(i,j) and QC(i−1,j), j-th quantized transform coefficients in an i-th and an (i−1)st quantized sets, respectively; and QC(0,j) has a zero value.

13. The method according to claim 11, wherein a difference value is defined by an equation selected from the group consisting of:

E(i,j)=|C(i,j)−C(i−1,j)|,
E(i,j)={C(i,j)−C(i−1,j)}²,
E(i,j)=w(j)·|C(i,j)−C(i−1,j)|, and
E(i,j)=w(j)·{C(i,j)−C(i−1,j)}², E(i,j) being an i-th difference value in a j-th set of difference values, w(j) being a weight factor and C(0,j) being zero.

14. The method according to claim 13, wherein said determining step (f) includes the steps of:

(f1) providing a sum of difference values included in each set, a sum S(j) for a j-th set of difference values being defined as $$S(j) = \sum_{i=1}^{I} E(i,j);$$

(f2) calculating the degree of correlations DEG defined as $$DEG = \frac{1}{K} \cdot \sum_{j=1}^{K} S(j),$$

K being a positive integer equal to or smaller than J;

(f3) comparing the degree of correlations DEG with a predetermined threshold value TH0; and (f4) if DEG is smaller than TH0, determining the degree of correlations to be high and deciding the degree of correlations to be low if otherwise.

15. The method according to claim 13, wherein said determining step (f) includes:

(f11) providing a sum of difference values included in each set, a sum S(j) for a j-th set of difference values being defined as $$S(j) = \sum_{i=1}^{I} E(i,j);$$

(f12) comparing sums S(1) to S(K) with a preset threshold TH1, K being a positive integer not greater than J(=M×N);

(f13) obtaining the number of the sums which are smaller than TH1; and (f14) if the number of the sums is greater than a preset number, determining that the degree of correlations is high and, if otherwise, determining that the degree of correlations is low.

16. An apparatus for encoding a frame of a video signal, wherein the frame is divided into non-overlapping blocks of M×N pixels and the apparatus includes means for assigning a quantization scale to each block, M and N being positive integers, respectively, the apparatus comprising:

means for arranging P×Q neighboring blocks assigned with an identical quantization scale into a group of blocks, P and Q being positive integers, respectively;

means for transforming each of the P×Q blocks in a group into a set of M×N transform coefficients to thereby provide P×Q sets of MxN transform coefficients for the group, said transform coefficients in each set representing different frequency components, respectively;

means for quantizing the sets of transform coefficients into P×Q sets of M×N quantized transform coefficients;

means for DPCM(differential pulse code modulation) coding the sets of quantized transform coefficients to provide P×Q sets of DPCM coefficients, wherein one set of DPCM coefficients is identical to one of the sets of quantized transform coefficients and each of the DPCM coefficients included in the other remaining sets represents a difference between two quantized transform coefficients of an identical frequency component; and means for setting the P×Q sets of DPCM coefficients as encoded data for the group of P×Q blocks.

17. The apparatus according to claim 16, further comprising:

means for calculating difference values between the quantized transform coefficients corresponding to an identical frequency component to thereby provide M×N sets of difference values;

means for determining, based on the sets of difference values, whether a degree of correlations among the blocks in the group is high or low; and means for updating the encoded data with the P×Q quantized sets of M×N transform coefficients if the degree of correlations is determined to be low.

18. The apparatus according to claim 17, wherein a quantized transform coefficient expressed as QC(i,j) represents the quantized transform coefficient corresponding to a j-th frequency component in an i-th set of quantized transform coefficients, said i being a positive integer ranging from 1 to I(=P×Q), and j being a positive integer ranging from 1 to J(=M×N); and said difference values are defined by an equation selected from the group consisting of:
E(i,j)=|QC(i,j)−QC(i−1,j)|,
E(i,j)={QC(i,j)−QC(i−1,j)}$^2$,
E(i,j)=w(j)·|QC(i,j)−QC(i−1,j)|, and
E(i,j)=w(j)·{QC(i,j)−QC(i−1,j)}$^2$, wherein E(i,j) is an i-th difference value in a j-th set of difference values, w(j) is a weight factor and QC(0,j) is set to zero.

19. The apparatus according to claim 18, wherein said determining means includes:

means for providing a sum of difference values included in each set, a sum S(j) for a j-th set of difference values being defined as $$S(j) = \sum_{i=1}^{I} E(i, j);$$

means for calculating the degree of correlations DEG defined as $$DEG = \frac{1}{K} \cdot \sum_{j=1}^{K} S(j)$$

K being a positive integer equal to or smaller than J;

means for comparing the degree of correlations DEG with a predetermined threshold value TH0; and means for if DEG is smaller than TH0, determining the degree of correlations to be high; and deciding the degree of correlations to be low, if otherwise.

20. The apparatus according to claim 18, wherein said determining means includes:

means for providing a sum of difference values included in each set, a sum S(j) for a j-th set of difference values being defined as $$S(j) = \sum_{i=1}^{I} E(i, j);$$

means for comparing sums S(1) to S(K) with a preset threshold TH1, K being a positive integer not greater than J(=M×N);

means for obtaining the number of the sums which are smaller than TH1; and means for determining that the degree of correlations is high if the number of the sums is greater than a preset number; and determining that the degree of correlations is low if otherwise.

\* \* \* \* \*